United States Patent
Tseng et al.

(10) Patent No.: US 8,259,276 B2
(45) Date of Patent: Sep. 4, 2012

(54) ACTIVE DEVICE ARRAY SUBSTRATE WITH PLURALITY OF MARKS IN A PERIPHERAL AREA AND LIQUID CRYSTAL DISPLAY PANEL

(75) Inventors: Kuei-Sheng Tseng, Taoyuan County (TW); Hsiang-Pin Fan, Hsinchu (TW); Ming-Chang Shih, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 621 days.

(21) Appl. No.: 12/368,972

(22) Filed: Feb. 10, 2009

(65) Prior Publication Data

US 2010/0118252 A1  May 13, 2010

(30) Foreign Application Priority Data

Nov. 12, 2008  (TW) ................................ 97143749 A

(51) Int. Cl.
 *G02F 1/1345* (2006.01)
 *G09G 3/36* (2006.01)
(52) U.S. Cl. ........ 349/149; 349/150; 349/151; 349/152; 345/104
(58) Field of Classification Search .......... 349/149–152; 345/90, 104
See application file for complete search history.

(56) References Cited

U.S. PATENT DOCUMENTS

| | | | | |
|---|---|---|---|---|
| 4,472,066 A | * | 9/1984 | Murakami | 368/82 |
| 5,189,539 A | | 2/1993 | Suzuki | |
| 5,757,450 A | * | 5/1998 | Fujii et al. | 349/106 |
| 6,597,427 B1 | * | 7/2003 | Katsu et al. | 349/192 |
| 6,734,931 B2 | * | 5/2004 | Yu | 349/106 |
| 6,812,984 B2 | * | 11/2004 | Watanabe et al. | 349/139 |
| 6,914,586 B2 | * | 7/2005 | Burkhardt | 345/87 |
| 7,144,759 B1 | | 12/2006 | Hilton et al. | |
| 2003/0174271 A1 | * | 9/2003 | Fujikawa | 349/149 |
| 2008/0137016 A1 | | 6/2008 | Kim et al. | |

FOREIGN PATENT DOCUMENTS

| TW | 451162 | 8/2001 |
|---|---|---|
| TW | 200619791 | 6/2006 |

OTHER PUBLICATIONS

"Office Action of Taiwan counterpart application" issued on Mar. 30, 2012, p. 1-p. 6, in which the listed references were cited.

* cited by examiner

*Primary Examiner* — Hoan C Nguyen
(74) *Attorney, Agent, or Firm* — Jianq Chyun IP Office

(57) ABSTRACT

An active device array substrate includes a substrate, a pixel array, a peripheral circuit, and a number of marks. The substrate has an active area and a peripheral circuit area that is connected to the active area. The pixel array is disposed on the active area of the substrate. The peripheral circuit is disposed on the peripheral circuit area of the substrate. Besides, the peripheral circuit includes a number of driver bonding pads, a number of fan-out lines, and a number of connecting lines. The fan-out lines are electrically connected to the pixel array. Each of the connecting lines connects one of the driver bonding pads and one of the fan-out lines. Additionally, the connecting lines are arranged in different pitches. Each of the marks is disposed between two adjacent connecting lines.

4 Claims, 2 Drawing Sheets

ACTIVE DEVICE ARRAY SUBSTRATE WITH PLURALITY OF MARKS IN A PERIPHERAL AREA AND LIQUID CRYSTAL DISPLAY PANEL

CROSS-REFERENCE TO RELATED APPLICATION

This application claims the priority benefit of Taiwan application serial no. 97143749, filed on Nov. 12, 2008. The entirety of the above-mentioned patent application is hereby incorporated by reference herein and made a part of specification.

BACKGROUND OF THE INVENTION

1. Field of the Invention

The present invention relates to a liquid crystal display (LCD) panel, and more particularly to an active device array substrate of an LCD panel.

2. Description of Related Art

With rapid development of image display technologies, cathode ray tube (CRT) displays that used to be applied in televisions or computers have been gradually replaced by LCDs. An LCD panel of the LCD is usually constituted by an active device array substrate, an opposite substrate, and a liquid crystal layer disposed between said two substrates. Besides, said two substrates are usually adhered to each other by sealant, so as to prevent liquid crystals from overflowing.

In general, the active device array substrate has an active area and a peripheral circuit area. In the active area, a plurality of pixels are disposed to form a pixel array. Besides, a peripheral circuit is formed in the peripheral circuit area. Each of the pixels includes a thin film transistor (TFT) and a pixel electrode connected thereto. Additionally, each of the pixels are surrounded by and electrically connected to two adjacent scan lines and two adjacent data lines. These scan lines and data lines are extended from the active area to the peripheral area and connected to the aforesaid peripheral circuit, and the peripheral circuit is then connected to external driver integrated circuits (ICs).

Due to demands on high image resolution and compactness of the LCD, the technology of mounting and packaging driver ICs on the LCD panel has evolved gradually from chip on board (COB) to tape automated bonding (TAB), and afterwards to chip on glass (COG) and chip on film (COF) of which fine pitches exist among pins. Here, the COF technique and the COG technique belong to a high-pin-count package technique by which the numbers of driver ICs and circuit boards for coupling can be reduced. As a result, the COF technique and the COG technique have little by little proceeded.

As the number of pins increases, line width and the pitch of the peripheral circuit correspondingly decrease, and thereby it is much more difficult to fabricate marks used for marking positions of the peripheral circuit or pin numbers thereof. In other words, the marks cannot be manufactured between traces by applying a conventional manufacturing process. Taking the current 4.0 micron process for example, the minimum width of the mark is approximately 12.0 microns, whereas the pitch between two traces in the current peripheral circuit is designed to be 22.0 microns in most cases. Besides, the minimum pitch is 9.0 microns. Hence, when the mark is planned to be formed between two traces, a distance from the mark to the two traces is required to be at least 9.0 microns, respectively, and thus the width of the mark must be less than 4.0 microns.

As such, in fabrication of the LCD panel at present, it is rather imperative to propose a way to overcome said defect and to prevent the same from occurring.

SUMMARY OF THE INVENTION

The present invention is directed to an active device array substrate in which each connecting line located between a driver bonding pad and a fan-out line is arranged in different pitches.

The present invention is further directed to an LCD panel having said active device array substrate.

In the present invention, an active device array substrate including a substrate, a pixel array, a peripheral circuit, and a plurality of marks is provided. The substrate has an active area and a peripheral circuit area that is connected to the active area. The pixel array is disposed on the active area of the substrate. The peripheral circuit is disposed on the peripheral circuit area of the substrate. In addition, the peripheral circuit includes a plurality of driver bonding pads, a plurality of fan-out lines, and a plurality of connecting lines. The fan-out lines are electrically connected to the pixel array. Each of the connecting lines is connected with one of the driver bonding pads and one of the fan-out lines, and the connecting lines are arranged in different pitches. Each of the marks is respectively disposed between two of the adjacent connecting lines.

According to an embodiment of the present invention, the pixel array of the active device array substrate includes a plurality of pixels and a plurality of signal lines. The pixels are disposed on the active area. The signal lines are disposed on the active area and electrically connected to the pixels.

According to an embodiment of the present invention, in the active device array substrate, the number of the connecting lines is greater than the number of the marks.

According to an embodiment of the present invention, in the active device array substrate, two or more of the connecting lines are located between two of the adjacent marks.

According to an embodiment of the present invention, in the active device array substrate, a pitch between two of the connecting lines respectively disposed at two sides of each of the marks is $P_1$, a pitch between two of the connecting lines with none of the marks disposed therebetween is $P_2$, and $P_1 > P_2$.

According to an embodiment of the present invention, in the active device array substrate, $P_2$ is greater than or equal to critical dimension.

According to an embodiment of the present invention, parts of the connecting lines in the active device array substrate have a plurality of deflections.

According to an embodiment of the present invention, in the active device array substrate, the marks include numerals, letters, symbols, or a combination thereof.

According to an embodiment of the present invention, in the active device array substrate, a material of the marks is the same as a material of the connecting lines.

In the present invention, an active device array substrate including a substrate, a pixel array, a peripheral circuit, and at least one mark is further provided. The substrate has an active area and a peripheral circuit area that is connected to the active area. The pixel array is disposed on the active area of the substrate. The peripheral circuit is disposed on the peripheral circuit area of the substrate. Besides, the peripheral circuit includes a plurality of driver bonding pads, a plurality of fan-out lines, and a plurality of connecting lines. The fan-out lines are electrically connected to the pixel array, and each of the connecting lines is connected to one of the driver bonding pads and one of the fan-out lines. The at least one mark is disposed between two of the adjacent connecting lines. A pitch between two of the connecting lines respectively disposed at two sides of the at least one mark is $P_1$, a pitch between two of the connecting lines with none of the at least one mark disposed therebetween is $P_2$, and $P_1 > P_2$.

According to an embodiment of the present invention, in the active device array substrate, $1 < (P_1/P_2) \leq 5$.

In the present invention, an LCD panel including an active device array substrate, an opposite substrate, and a liquid crystal layer is further provided. The active device array substrate includes a substrate, a pixel array, a peripheral circuit, and a plurality of marks. The substrate has an active area and a peripheral circuit area that is connected to the active area. The pixel array is disposed on the active area of the substrate. The peripheral circuit is disposed on the peripheral circuit area of the substrate. Besides, the peripheral circuit includes a plurality of driver bonding pads, a plurality of fan-out lines, and a plurality of connecting lines. The fan-out lines are electrically connected to the pixel array. Each of the connecting lines is connected with one of the driver bonding pads and one of the fan-out lines, and the connecting lines are arranged in different pitches. Each of the marks is disposed between two of the adjacent connecting lines. The opposite substrate is disposed at an opposite side of the active device array substrate. The liquid crystal layer is disposed between the active device array substrate and the opposite substrate.

In the active device array substrate and the LCD panel of the present invention, the connecting lines in the peripheral circuit are arranged in different pitches, such that the marks in the peripheral circuit are apt to be disposed between two of the adjacent connecting lines without affecting the existing pitches and designs of the fan-out lines and the driver bonding pads.

In order to the make the aforementioned and other features and advantages of the present invention comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Note that detailed structures provided in the following embodiments as examples can all be combined, replaced, or omitted under reasonable circumstances, so as to comply with actual demands. After referring to the descriptions in the following embodiments, a person skilled in the art should be able to comprehend the spirit and features of the present invention and make practical modifications and applications without departing from the spirit of the invention and in a manner consistent with the scope of the invention. Besides, to facilitate illustration and comprehension of the disclosure, same reference numbers represent same or similar elements, and repetitive explanation is likely to be omitted.

Figure 1:
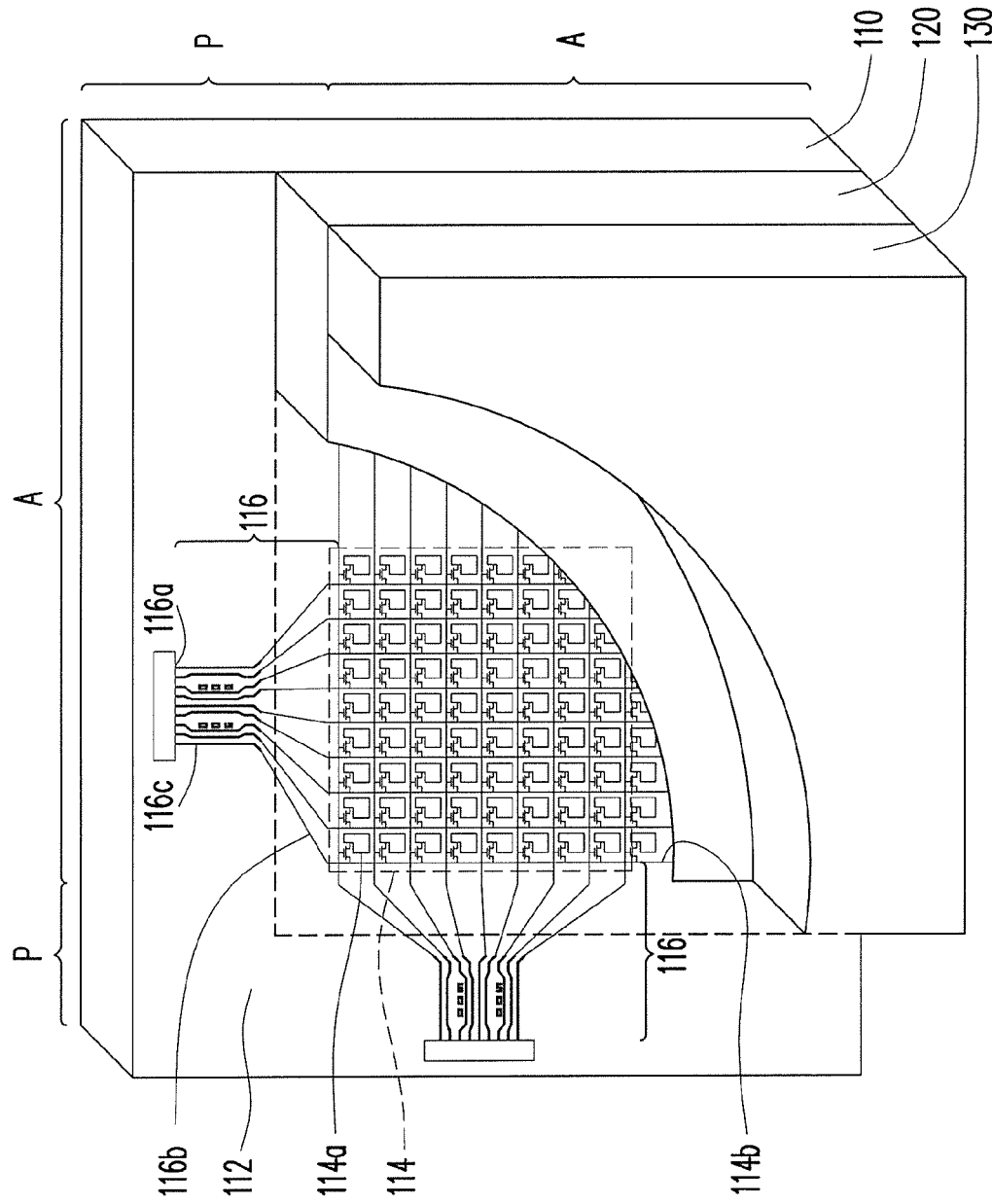
FIG. 1 is a schematic view of an LCD panel according to an embodiment of the present invention.
Figure 2:
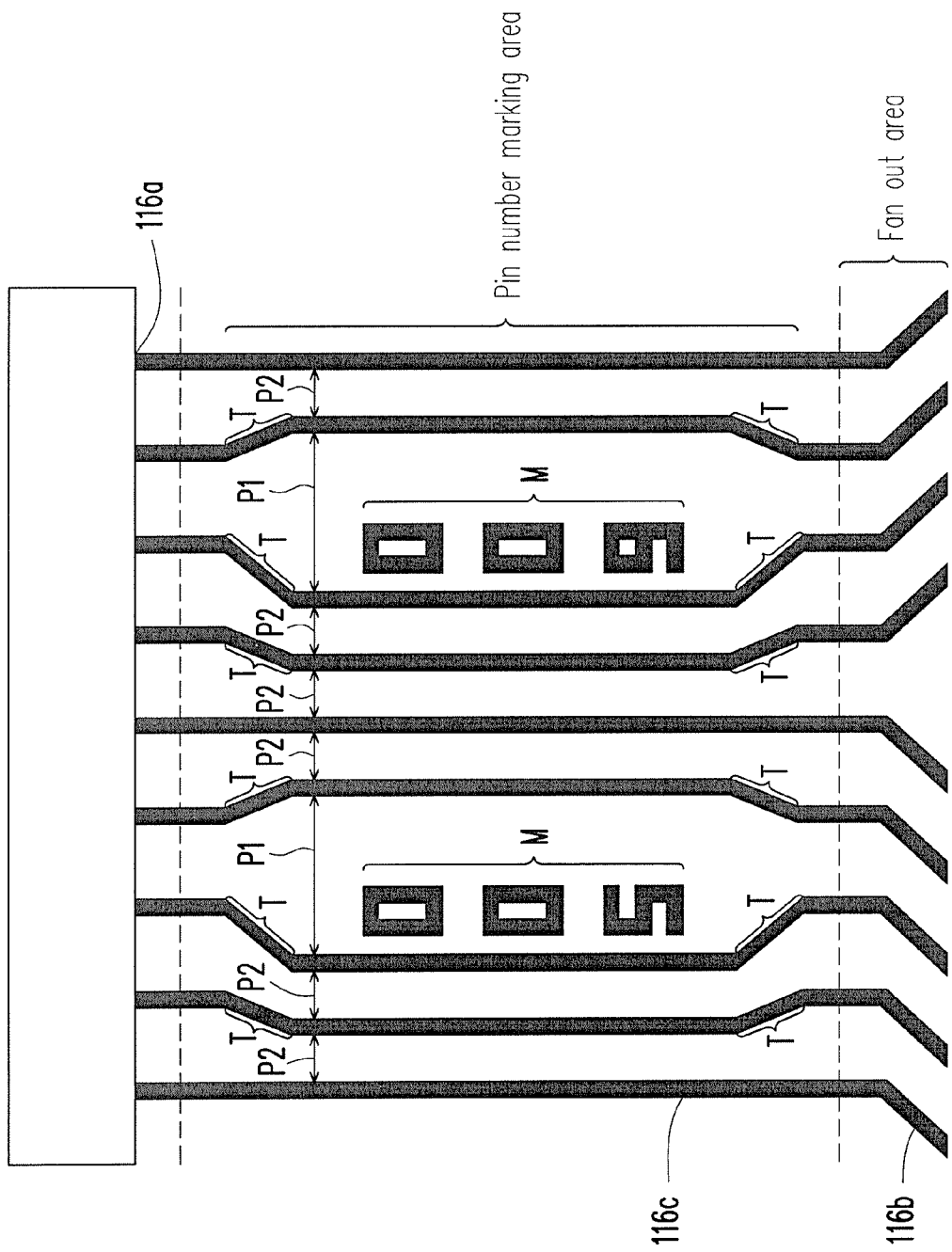
FIG. 2 is a schematic partial enlarged view of a peripheral circuit area.

FIG. 1 is a schematic diagram of an LCD panel according to an embodiment of the present invention. FIG. 2 is a schematic partial enlarged view of a peripheral circuit area. As shown in FIG. 1, an LCD panel 100 has an active device array substrate 110, an opposite substrate 130, and a liquid crystal layer 120. The active device array substrate 110 and the opposite substrate 130 are disposed opposite to each other, and the liquid crystal layer 120 is disposed between the active device array substrate 110 and the opposite substrate 130.

In the present embodiment, the active device array substrate 110 is, for example, a TFT array substrate or other types of active device array substrates. The opposite substrate 130 is, for example, a color filter substrate. Certainly, the types of the active device array substrate 110 and the opposite substrate 130 are not limited in the present invention. According to other embodiments, the active device array substrate 110 can be a color filter on array (COA) substrate or an array on color filter (AOC) substrate.

Next, referring to FIGS. 1 and 2, the active device array substrate 110 includes a substrate 112, a pixel array 114, a peripheral circuit 116, and a plurality of marks M. The substrate 112 has an active area A and a peripheral circuit area P connected to the active area A. The pixel array 114 is disposed on the active area A of the substrate 112. Images are displayed in the active area A. Additionally, in the present embodiment, the pixel array 114 can further include a plurality of pixels 114a and a plurality of signal lines 114b, and the pixels 114a and the signal lines 114b are disposed on the active area A. The signal lines 114b are electrically connected to the pixels 114a. In the present embodiment, the pixels 114a include TFTs and pixel electrodes corresponding to the TFTs. The signal lines 114b surrounding the pixels 114a are, for example, horizontally extended scan lines and vertically extended data lines.

The peripheral circuit 116 is disposed on the peripheral circuit area P of the substrate 112, so as to electrically connect driver ICs and the pixel array 114 in the active area A. Specifically, the peripheral circuit 116 has a plurality of driver bonding pads 116a, a plurality of fan-out lines 116b, and a plurality of connecting lines 116c. Here, the driver bonding pads 116a are formed on regions where the peripheral circuit 116 and the driver ICs are bonded together. The fan-out lines 116b are formed on regions where the peripheral circuit 116 is electrically connected to the pixel array 114. Moreover, the connecting lines 116c are formed on regions where the fan-out lines 116b and the driver bonding pads 116a in the peripheral circuit 116 are connected. Namely, each of the connecting lines 116c connects one of the driver bonding pads 116a and one of the fan-out lines 116b, and the connecting lines 116c are arranged in different pitches. The fan-out-line 116 and the connection line 116c connected with the fan-out-line 116 may be formed in the same line, and that is to say, the fan-out-line 116 and the connection line 116c connected with the fan-out-line 116 may be formed simultaneously by a single line.

Referring to FIG. 2, the marks M are respectively disposed between two adjacent connecting lines 116c. Generally, the marks M serve to label numbers of different connecting lines 116c, such that the connecting lines 116c can be accurately recognized in subsequent processes. In the present embodiment, the marks M are numbers, and a material of the marks M is the same as a material of the connecting lines 116c. For instance, the marks M and the connecting lines 116c can be manufactured in the same process. By contrast, in other embodiments of the present invention, the marks M can also be numbers, letters, symbols, or a combination thereof.

As indicated in FIG. 2, according to the present embodiment, a pitch between two of the connecting lines 116c respectively disposed at two sides of each of the marks M is $P_1$, a pitch between two of the connecting lines 116c with none of the marks M disposed therebetween is $P_2$, and $P_1 > P_2$.

Preferably, $1<(P_1/P_2)\leq5$. Nonetheless, the value of $(P_1/P_2)$ is not confined to range from 1 to 5 in the present invention. The value of $P_1/P_2$ based on actual design demands may be adjusted or modified.

In other embodiments of the present invention, the pitch between the connecting lines 116c is likely to be categorized into three types or more and is not limited to $P_1$ and $P_2$.

Note that the pitch $P_2$ between two of the connecting lines 116c with none of the marks M disposed therebetween is still required to be greater than critical dimension (CD). The so-called CD is the minimum pitch between the two adjacent connecting lines 116c that are not overlapped to each other. Besides, the minimum pitch can be distinctly defined in an exposure process of the TFTs and is not to such an extent as to be ambiguous.

According to the present embodiment, parts of the connecting lines 116c have a plurality of deflections T. Hence, the pitch between the connecting lines 116c can be adjusted merely by means of the deflections T without changing the pitch between the connecting lines 116c of which the two sides are respectively connected to the driver bonding pads 116a and the fan-out lines 116b.

Referring to FIG. 2, in the present embodiment, the number of the connecting lines 116c is greater than the number of the marks M. That is to say, two or more of the connecting lines 116c exist between two of the adjacent marks M. For example, in FIG. 2, 4 connecting lines 116c are disposed between two of the adjacent marks M. Namely, parts of the adjacent connecting lines 116c are disposed without the marks M located therebetween. Moreover, as exemplified in FIG. 2, the two adjacent marks M are labeled as 005 and 006, and pin numbers between the two adjacent marks M are 006, 007, and 008 in sequence. Thereby, use of the marks M can be simplified.

In light of the foregoing, the connecting lines are arranged in different pitches in the active device array substrate and the LCD panel of the present invention. As such, difficulties in fabricating the marks can be remarkably reduced.

Although the present invention has been disclosed above by the embodiments, they are not intended to limit the present invention. Anybody skilled in the art can make some modifications and alterations without departing from the spirit and scope of the present invention. Therefore, the protecting range of the present invention falls in the appended claims.

What is claimed is:

1. An active device array substrate, comprising:
    a substrate having an active area and a peripheral circuit area connected to the active area;
    a pixel array disposed on the active area of the substrate;
    a peripheral circuit disposed on the peripheral circuit area of the substrate and, comprising:
    a plurality of driver bonding pads;
    a plurality of fan-out lines electrically connected to the pixel array; and
    a plurality of connecting lines, each of the plurality of connecting lines respectively connected with one of the plurality of driver bonding pads and one of the plurality of fan-out lines; and
    at least one mark disposed between two of the plurality of connecting lines adjacent to each other, wherein the mark is a pin number marks, which is not connected to any electrode or connecting line, and a pitch between two of the plurality of connecting lines disposed at two sides of the at least one mark is P1, a pitch between two of the plurality of connecting lines with none of the at least one mark disposed therebetween is P2, and P1>P2.

2. The active device array substrate as claimed in claim 1, wherein $1<(P1/P2)\leq5$.

3. The active device array substrate as claimed in claim 1, wherein one of the plurality of fan-out-lines and one of the plurality of connection lines connected with the one of the plurality of fan-out-lines are formed in the same line.

4. An active device array substrate, comprising:
    a substrate having an active area and a peripheral circuit area connected to the active area;
    a pixel array disposed on the active area of the substrate;
    a peripheral circuit disposed on the peripheral circuit area of the substrate and, comprising:
    a plurality of driver bonding pads;
    a plurality of fan-out lines electrically connected to the pixel array; and
    a plurality of connecting lines, each of the plurality of connecting lines respectively connected with one of the plurality of driver bonding pads and one of the plurality of fan-out lines; and
    at least one mark disposed between two of the plurality of connecting lines adjacent to each other, wherein the plurality of marks are separated from any of the pixel array, the peripheral circuit, the plurality of driver bonding pads, the plurality of fan-out lines and the plurality of connecting lines, and wherein a pitch between two of the plurality of connecting lines disposed at two sides of the at least one mark is P1, a pitch between two of the plurality of connecting lines with none of the at least one mark disposed therebetween is P2, and P1>P2, wherein $1<(P1/P2)\leq5$.

* * * * *